(12) United States Patent
Lensky

(10) Patent No.: US 7,937,659 B2
(45) Date of Patent: May 3, 2011

(54) METHOD FOR DISPLAYING ROLL-DOWN MESSAGES ON AN AIRCRAFT DISPLAY, AND A DEVICE EMPLOYING THE SAID METHOD

(75) Inventor: Marina Lensky, Beauzelle (FR)

(73) Assignee: Airbus France, Toulouse (FR)

( * ) Notice: Subject to any disclaimer, the term of this patent is extended or adjusted under 35 U.S.C. 154(b) by 935 days.

(21) Appl. No.: 11/586,353

(22) Filed: Oct. 25, 2006

(65) Prior Publication Data
US 2007/0157111 A1    Jul. 5, 2007

(30) Foreign Application Priority Data

Oct. 25, 2005   (FR) ..................... 05 53246

(51) Int. Cl.
*G06F 3/00* (2006.01)
*G06F 17/24* (2006.01)
*G06F 3/048* (2006.01)

(52) U.S. Cl. ........ 715/700; 715/238; 715/784; 715/785; 715/786; 715/787

(58) Field of Classification Search .......... 715/784–787, 715/238
See application file for complete search history.

(56) References Cited

U.S. PATENT DOCUMENTS

| 4,709,348 | A | 11/1987 | Horn et al. |
| 5,390,354 | A | 2/1995 | de Heus et al. |
| 6,279,018 | B1 * | 8/2001 | Kudrolli et al. ............... 715/234 |
| 2001/0011364 | A1 * | 8/2001 | Stoub ............................... 717/1 |
| 2005/0097458 | A1 * | 5/2005 | Wilson ........................... 715/517 |
| 2006/0265109 | A1 * | 11/2006 | Canu-Chiesa et al. ............ 701/3 |

OTHER PUBLICATIONS

M. Nudelman: "UNIX man pages: less" [Online] 2002, Free Software Foundation, UNIX Technical Documentation, XP002381403 Internet: URL:http://unixhelp.ed.ac.uk/CGI/man-cgi?less+1, May 11, 2005.

C. Barnel, M. Dubois, T. Ohlmann: "Messages de gestion de flotte dans un système embarqué routier: quels formats de présentation?", Oct. 2003, Epique 2003, Deuxiemes Journées D'Etude en Psychologie Ergonomique, Boulogne-Billancourt, France, XP002381404, p. 167, lines 24-32.

* cited by examiner

*Primary Examiner* — Boris Pesin
*Assistant Examiner* — Andres E Gutierrez
(74) *Attorney, Agent, or Firm* — Patterson Thuente Christsensen Pedersen, P.A.

(57) ABSTRACT

The invention relates to a method to display page by page a roll-down message in a display zone of a viewer in an aircraft's cockpit, comprising, for each message, the following operations:
 selection of a full length for the message to be displayed,
 selection of a visible length for the message to be displayed in the display zone,
 selection of a repeated length for the message, this repeated length being the length displayed in a current page and copied again into the next page,
 determination of a total number of pages to be displayed in order for the total length of the message to be displayed with the selected repeated lengths, such total number of pages being determined in the following manner:

$$Np = \text{lower\_full\_part}\left(\frac{Lm - Lv + 2Lc - 1}{Lc}\right)$$

with $Lc = Lv - Lr$,
where $Np$ is the total number of pages, $Lm$ is the total length of the message, $Lv$ is the visible length of the message in the display zone, $Lr$ is the repeated length of the message and $Lc$ is the non-repeated length of the message.
The invention also relates to a device for implementing this method.

17 Claims, 4 Drawing Sheets forward scrolling backward scrolling forward scrolling backward scrolling

Fig. 4

| PGE 1/8 | LINE01 LINE02 LINE03 |
| PGE 2/8 | LINE03 LINE04 LINE05 |
| PGE 3/8 | LINE05 LINE06 LINE07 |
| PGE 4/8 | LINE07 LINE08 LINE09 |
| PGE 5/8 | LINE09 LINE10 LINE11 |
| PGE 6/8 | LINE11 LINE12 LINE13 |
| PGE 7/8 | LINE13 LINE14 LINE15 |
| PGE 8/8 | LINE15 LINE16 |

Fig. 3

| PGE 1/4 | LINE01 LINE02 LINE03 LINE04 LINE05 |
| PGE 2/4 | LINE05 LINE06 LINE07 LINE08 LINE09 |
| PGE 3/4 | LINE09 LINE10 LINE11 LINE12 LINE13 |
| PGE 4/4 | LINE13 LINE14 LINE15 LINE16 |

METHOD FOR DISPLAYING ROLL-DOWN MESSAGES ON AN AIRCRAFT DISPLAY, AND A DEVICE EMPLOYING THE SAID METHOD

RELATED APPLICATION

The present application claims priority to French Application No. 05 53246 filed Oct. 25, 2005, which is incorporated herein in its entirety by reference.

FIELD OF THE INVENTION

The Invention concerns a process allowing page-by-page display of roll-down messages on an aircraft cockpit display. The Invention also concerns a device employing the said procedure.

Applications for the Invention exist in the field of air navigation and, in particular, in the field of message display in aircraft cockpits.

STATE OF THE ART

In the field of air navigation and notably air traffic control systems, the aircraft pilot generally exchanges messages transmitted to and received from the ground, in particular, with air traffic control centre personnel, both during the take-off and landing phases as well as in flight. Several types of messages are exchanged with control centres: flight plan messages, en-route messages, pilot messages, or weather information concerning departure and arrival airports. The pilot also transmits other messages to the ground, essentially acknowledgements to received messages, requests to air traffic control centres, and status reports from the flight management system.

Aircraft cockpits or flight decks may comprise a certain number of displays for displaying messages sent from the ground for the pilot, as well as the pilot's messages back to ground. These displays, or CDS (Cockpit Display Systems), consist of screens that may feature tactile keys permitting interaction between the pilot and ground personnel. These displays allow all messages to be displayed by scrolling from page to page.

The said displays employ several types of message display zones. In effect, not all exchanged messages are displayed with the same format. One type of display is characterised by parameters such as the width and height of the display zone, the number of lines, or the manner in which the message is cut if it is too long to fit in the zone. Therefore, displays comprise various types of display zones, reserved for certain types of messages.

For example, messages known as CPDLC's (Controller-Pilot DataLink Communications), employed for exchanging flight information between the aircraft and air traffic control, are displayed on a certain type of display known as a "mailbox". These Where Lc=Lv−Lr, CPDLC messages are particularly employed in areas of dense traffic or Pacific traffic zones (where no receiving beacons are available to allow voice traffic between pilots and air traffic control), to localize the aircraft and exchange information with control centres. The type of display used for displaying these mailbox messages, is standardised, viz.:

it must comprise five visible lines, the fifth line always being repeated on the following page, irrespective of the message page displayed;
  it must be able to display messages of variable length.

Logbook messages contain previously exchanged messages that were recorded during reception, for later reading by the pilot. Logbook messages are displayed on a second type of display, which must allow the pilot to zoom on the recorded message list, in order to consult a previous message. Logbook messages are also standardised:

they must contain eighteen visible lines, the last line of each page being repeated on the following page to facilitate reading for the pilot;
  they must offer variable length, of up to 4000 characters approximately.

ATIS (Automatic Terminal Information Service) messages, transmitted from the ground, contain information relating to the ground environment, such as the runway status, approach procedures, or weather data. ATIS messages are displayed on a third type of display, which is also standardised:

comprising eighteen visible lines, no line being repeated;
  and able to accommodate messages of variable lengths.

Irrespective of the display type, the said messages are scrolled page by page in the display zones of the instrument. In other words, each display zone comprises a window containing one page of message, with the required format or features (such as "five-line display", "18-line display with one line repeated" etc.). If the message to display is longer than the number of lines displayable in the window, then the message may be scrolled, page by page, in the window. Scrolling of the message is controlled by a scrolling key that automatically advances the message in the window, by the characteristic number of lines for the display type. For example, for the third type of display, pressing the scrolling key advances the message eighteen lines in the window. For the first and second types of display, pressing the scrolling key advances the message by the characteristic number of lines of the display type, less one line, since the last line displayed in the previous window is copied.

FIG. 1 shows an example of scrolling of message pages in a display zone of the first type, with a potential technique for managing display zones on a CDS (Cockpit Display System). This example shows three display windows for forward scrolling and three display windows for backward scrolling of the same message. The arrows indicate the chronology of the pilot's actions on the scrolling button. For forward scrolling, the first displayed page, PGE 1/3, contains lines 01 to 05 of the message. The second displayed page, PGE 2/3, contains lines 05 to 09 of the message. The third displayed page, PGE 3/3, contains lines 07 to 11 of the message. The first line of page PGE 2/3, displayed at the top of the display window, is the same as the last line of page PGE 1/3. Since the example is dealing with a display of the first type, each page comprises five lines. Thus, since the message comprises eleven lines, page PGE 3/3 contains message lines 07 to 11. Therefore page PGE 3/3 will contain three lines repeated identically from page PGE 2/3.

For the backward scrolling shown in FIG. 1, the last displayed page, PGE 3/3, contains message lines 07 to 11. The second displayed page, PGE 2/3, contains message lines 03 to 07. The first displayed page, PGE 1/3, contains message lines 01 to 05. The first line of page PGE 3/3, displayed at the top of the display window, is the same as the last line of page PGE 2/3. Since the message comprises eleven lines, page PGE 1/3 contains message lines 01 to 05. Therefore page PGE 1/3 contains three lines repeated identically from page PGE 2/3.

It is thus seen that page PGE 2/3 differs when the message is forward-scrolled or backward-scrolled. In effect, when scrolling the message downwards (that is, forward), therefore reading it from the first line to the last line, it is noted that the second window contains lines 05 to 09, whereas when scrolling the message upwards (that is, back), to reread the message from the end back to the beginning, the second page, PGE 2/3, contains lines 03 to 07. The page number display, for example, "PGE 2/3", is not deterministic. This display-difference may lead to difficulties of understanding on the part of the pilot, and hence to risk of pilot error. Determinism is all the more important because certification authorities demand that pilots read the entire message before answering.

Additionally, with the potential technique, each type of display is managed separately. Each type of display therefore requires an individual management program, with computing means assigned to each display zone.

DISCLOSURE OF INVENTION

The purpose of the Invention is precisely to remedy the disadvantages of the previously expounded techniques. In this respect, the Invention proposes a process for singly managing the various types of message-displays on cockpit displays. To this end, the Method of the invention considers that certain display parameters may be modified depending on the display zone in which the message must be displayed. These parameters notably include the number of visible lines, the total length of the message, and the number of lines that must be repeated from one page to the next. Depending on these parameters, the Method of the invention determines the number of necessary pages required in order to display the entire message in the display zone in question.

More precisely, the Invention concerns a process allowing the page-by-page display of a roll-down message in a display zone on an aircraft cockpit display, characterized in that that it includes, for each message, the following operations:
  selection of a total message length to display,
  selection of a visible message length to display in the display zone,
  selection of a repeated message length, this repeated length being the length displayed in a current page and copied into a following page,
  determination of a total number of pages to display so that the total message length is displayed with the selected repeated lengths, this total number of pages being determined as follows:

$$Np = \text{lower\_full\_part}\left(\frac{Lm - Lv + 2Lc - 1}{Lc}\right)$$

Where $Lc=Lv-Lr$,
Np being the total number of pages, Lm the total message length, Lv the visible message length in the display zone, Lr the repeated message length, and Lc the unrepeated message length.

The method of the invention may include one or more of the following features:
  a function to determine the current page displayed, as follows:

$$Nump = \text{lower\_full\_part}\left(\frac{Lda - Lv + 2Lc - 1}{Lc}\right)$$

where Nump is the number of the current page displayed, Lda being an indicator in the message, showing the last length displayed in the current page;
  the function to determine the current page displayed is performed following a message scrolling command;
  the total message length, the repeated message length and the visible message length are expressed as a number of message lines;
  the total message length, the repeated message length and the visible message length are expressed in units of measure;
  the unit of measure is the centimeter;
  the total message length, the repeated message length and the visible message length are measured in units of image;
  the unit of image is the pixel;
  selection of the total message length, the repeated message length and the visible length of total lengths, is determined depending on the type of display;
  the type of display is defined automatically depending on a message origin.

The Invention also concerns a device employing the previously described method. To this end, the Invention proposes a device allowing page-by-page display of a roll-down message in the display zone of an aircraft cockpit display, characterized in that it includes:
  means of selecting parameters, namely, total message length, repeated message length and visible message length,
  means of determining a total number of message pages, depending on the message parameters, the said means of determination being connected to the cockpit display.

The said device may include one or more of the following features:
  means of determining a current page displayed on the display;
  means of determining the total number of pages and the current page displayed, ported an aircraft's flight management computer;
  the display zone comprising a message scrolling key;
  the scrolling key is displayed in the Nump/Np pages, where $Nump \leq Np$.

BRIEF DESCRIPTION OF THE DRAWINGS

FIG. 3 represents an example of scrolling of a message in a display window for the first type of display.

FIG. 4 represents an example of scrolling of a message in a display window for the fourth type of display.

DETAILED DESCRIPTION OF EMBODIMENTS FOR THE METHOD OF THE INVENTION

Figure 1:
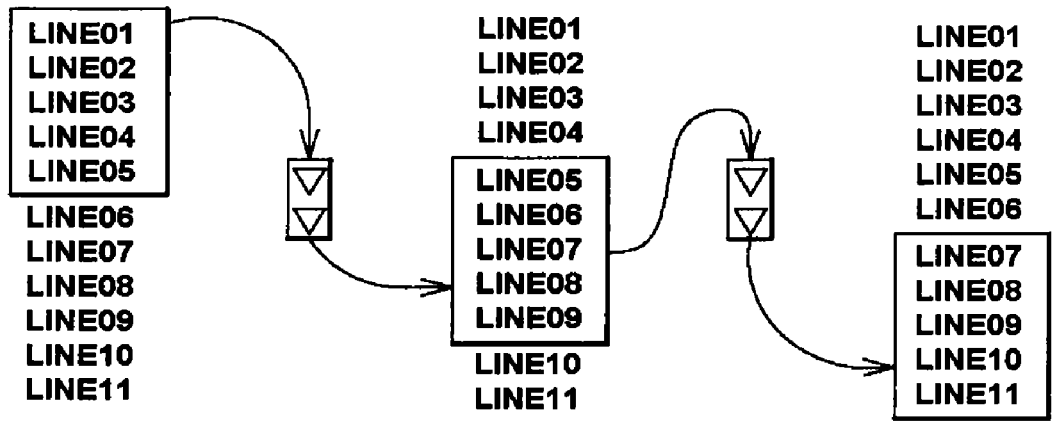
FIG. 1, already described, represents an example of forward and backward scrolling of a message in a display window where scrolling is managed via a conventional method.
Figure 1:
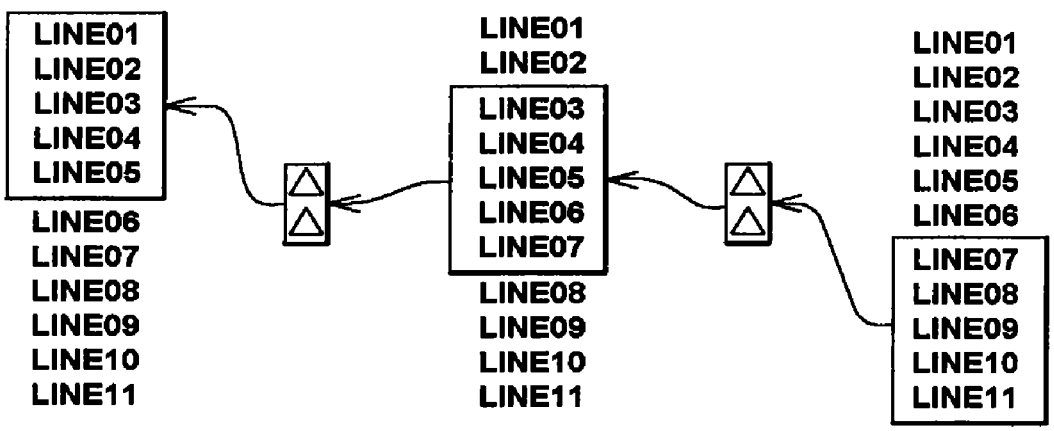

The method of the invention provides a unified method of managing the display of messages in different types of display zones, such that the provided display is deterministic. The method of the invention therefore allows page-by-page display of roll-down messages on different types of display zones in a cockpit display. In other words, the method of the invention allows managing message-display irrespective of the total message length, the length of message displayed in a page, or the length of message to be repeated.

The stated message-display features (total message length, length of message to display on a page, and length of message to repeat) are considered, in the method of the invention, as modifiable display parameters, depending on the type of message to display.

The message length parameter corresponds to the total message length to display. As will be seen hereafter in detail, this "total message length" parameter may be expressed as a number of lines, in metric units, or in image form.

The "length of message to display on page" parameter corresponds to the number of message length units that must be simultaneously visible on the display. This parameter, hereafter referred to as the "visible message length", may be expressed as a number of lines, in metric units, or in units of image.

The "length of message to repeat" parameter corresponds to the length of the message that must be displayed at the bottom of a page then copied into the top of the next page, so that the last part of a message written on one page is found again at the start of the following page. This parameter, referred to hereafter as the "repeated message length", may be expressed as a number of lines, in metric units, or in units of image.

In one embodiment of the Invention, it is assumed that the message length (either total, visible or repeated), is expressed as a number of lines. This imposes that the character set employed in each line of the message is fixed, which means that the font size must be identical for every line of message to display. The total message length parameter therefore corresponds to a total number of lines to display. Similarly, the visible message length and the repeated message length correspond, respectively, to a number of visible lines and a number of repeated lines.

In this embodiment, where the considered unit of length is a number of lines, the total number of lines is determined, for example, by the display unit, as a function of the line-break mode in question, that is, observing line-break criteria. In this embodiment, the visible length is a maximum number of lines, determined during definition of the display zone, and the length to repeat is a number of lines determined after evaluations by pilots and certification authorities (EASA).

The method of the invention proposes to incorporate these parameters, attributing each a value for each message to display. It then proposes, depending on the parameter values, to determine the total number of pages required to display all lines of the message, by applying the following formula:

$$Np = \text{lower\_full\_part}\left(\frac{Lm - Lv + 2Lc - 1}{Lc}\right)$$

where Np is the total number of pages, Lv being the number of visible lines, Lm the total number of lines in the message, and Lc the number of lines to be scrolled. The number of lines to scroll, Lc, is determined depending on the number of lines to repeat, Lr, using the formula: Lc=Lv−Lr.

Since Np—the number of pages—must always be greater than 1 if Lm is positive, then the following equation is used:

If $0 < Lm \leq Lv - Lc + 1 \Rightarrow Np = 1$

The method of the invention additionally proposes to determine the number of the current page of the display, by applying the following formula:

$$Nump = \text{lower\_full\_part}\left(\frac{Lda - Lv + 2Lc - 1}{Lc}\right)$$

where Nump is the number of the current page and Lda the in-message indicator showing the last length displayed in the current page. In this embodiment, Lda is the number of the last line displayed in the current page.

Since the page number—Nump—must always be greater than 1 if Lda is positive, then the following formula is used:

If $0 < Lda \leq Lv - Lc + 1 \Rightarrow Np = 1$

Thus, when the total number of pages necessary and the number of the current page are known, these two items may be displayed on the display, simultaneous with the message, for example, in the following format: PGE Nump/Np. This information informs the pilot precisely where in the message he is reading.

Thus determined by the method of the invention, the total number of pages and the current page number have the advantage of being deterministic, that is, they remain identical irrespective of the length of the message, or the manner in which the latter is scrolled. If, after initially reading the message the pilot requires to reread a part, he can trust the current page number displayed during the initial read, to retrieve the part of message to be reread. Irrespective of the direction in which the message is scrolled (forwards or backwards), a page with a current page number always contains the same lines.

Additionally, the method of the invention may be applied irrespective of the number of lines to scroll. It therefore applies equally for line-by-line scrolling of the message, that is, where, Lc=1.

Figure 2:
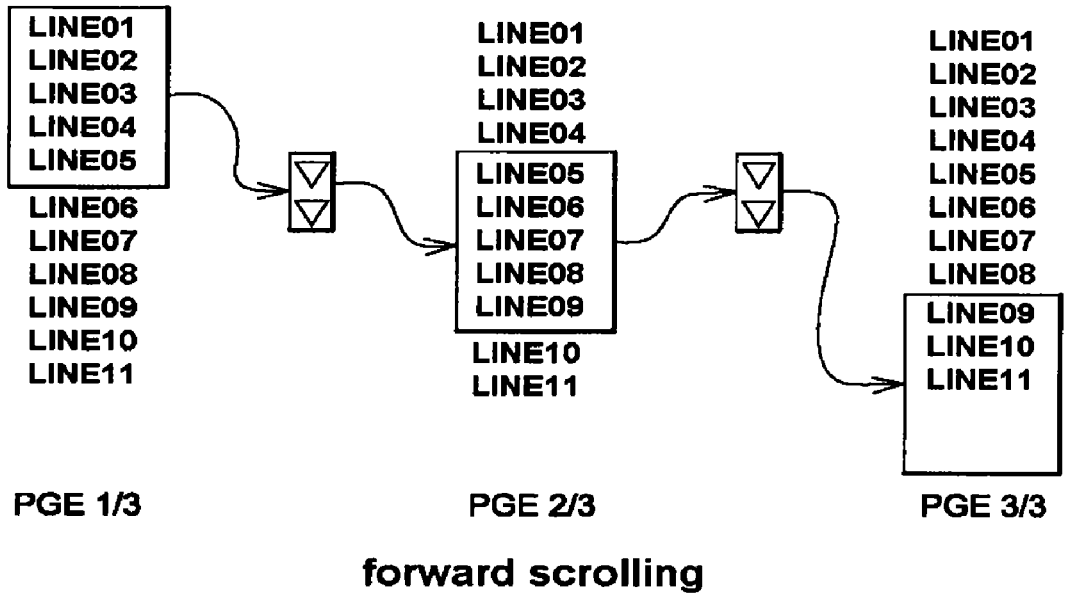
FIG. 2 represents an example of forward and backward scrolling of a message in a display window where scrolling is managed with the method of the invention.
Figure 2:
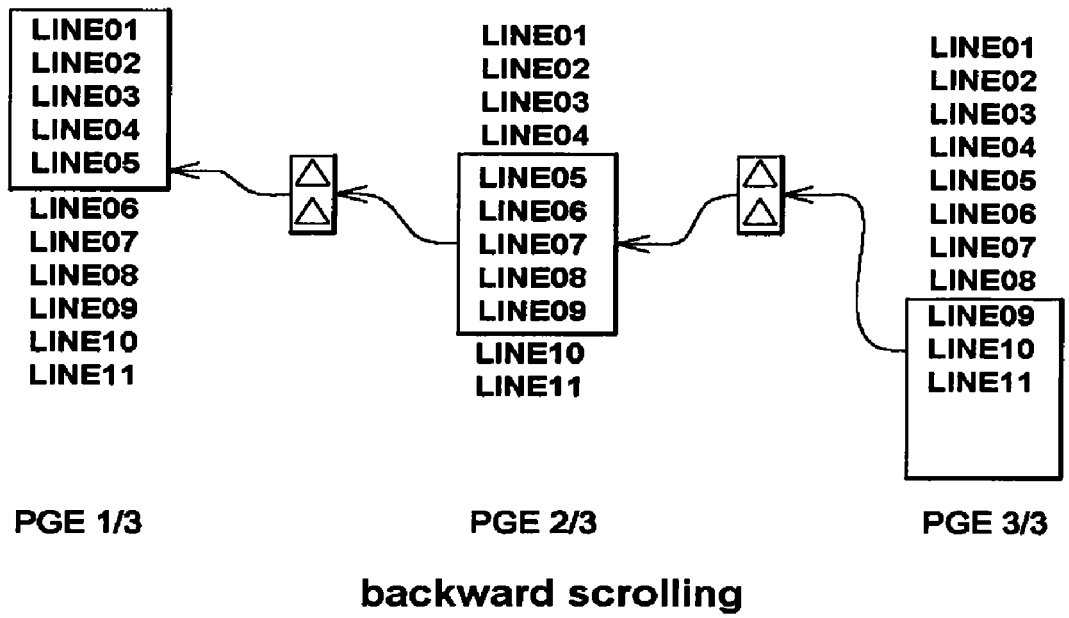

FIG. 2 shows an example of message displayed in several windows of a zone on a display of the first type, that is, having five visible lines and one line repeated. In this example, the message is the same as for FIG. 1, the type of display is the same as for FIG. 1, but the display is managed with the Method of the invention. With reference to FIG. 2, the example shows that, for positive scrolling of the message:

the first page, referred to as PGE 1/3, includes lines 1 to 5,
the second page, referred to as PGE 2/3, includes lines 5 to 9, and
the third page, referred to as PGE 3/3, includes lines 9 to 11.

On page PGE 3/3, it will be noticed that a space is left free below line 11. This space corresponds to the height of two additional lines. It will therefore be understood that, in similar display conditions, if the message comprises 12 or 13 lines, the page-numbering would be identical to the example in FIG. 2. On the other hand, if the message comprises 14 lines, then it would be displayed over four pages.

In the example in FIG. 2, with backward scrolling of the message, that is, returning from the end of the message towards the head of the message, as represented by the arrows, the display obtained is precisely the same in each of the windows. In other words, every page of the message is of identical composition, irrespective of the scrolling direction.

FIG. 3 shows an example of four display windows each displaying the five conventional lines of a mailbox message. This message comprises 16 lines. It must be displayed so that five lines are simultaneously visible, one of which will be repeated. The message lines are displayed on the left of the display zone. Information concerning the current page and the total number of pages in the message is displayed on the right of the display zone.

In this example, the values of the display parameters are therefore: Lm=16, Lv=5 and Lc=4 (which equates to repeating one line per page). The display in this example comprises four pages. The first page displayed, PGE 1/4, contains lines 01 to 05. The second displayed page, PGE 2/4, contains lines 05 to 09. The third displayed page, PGE 3/4, contains lines 09 to 13. The fourth displayed page, PGE 4/4, contains lines 13 to 16.

A scrolling key may also be displayed on the right of the display zone. This tactile key represents a double arrow. The latter points downwards when the message is forward-scrolled, and upwards when backward-scrolled. The tactile scrolling key corresponds to one embodiment of the Invention. It is naturally assumed that the message may be scrolled using a joystick or a scrolling button, as conventionally found in the communications field.

In the preferred embodiment of the invention, the scrolling key is displayed only when scrolling is possible. In particular, when the current page is the last page of the message, that is when Nump=Np, then the scrolling key is not displayed, which avoids any risk of keying errors by the pilot.

FIG. 4 represents another example of display windows for the same message as shown in FIG. 3, but for a different display zone. In this example, the display zone must comprise three visible lines, of which one is repeated. The values of the display parameters are therefore: Lm=16, Lv=3 and Lc=2 (which corresponds to repeating one line per page). The display in this example comprises eight pages. The first page displayed, PGE 1/8, contains lines 01 to 03. The second displayed page, PGE 2/8, contains lines 03 to 05. The third displayed page, PGE 3/8, contains lines 05 to 07 etc.

As explained previously, the just-described embodiment is employed when the parameters are expressed as a number of lines, that is, when the character set is fixed. It will be understood that when the character set is variable, that is, the font size varies from line to line, then the number of lines in a given display zone will also vary.

Figure 5:
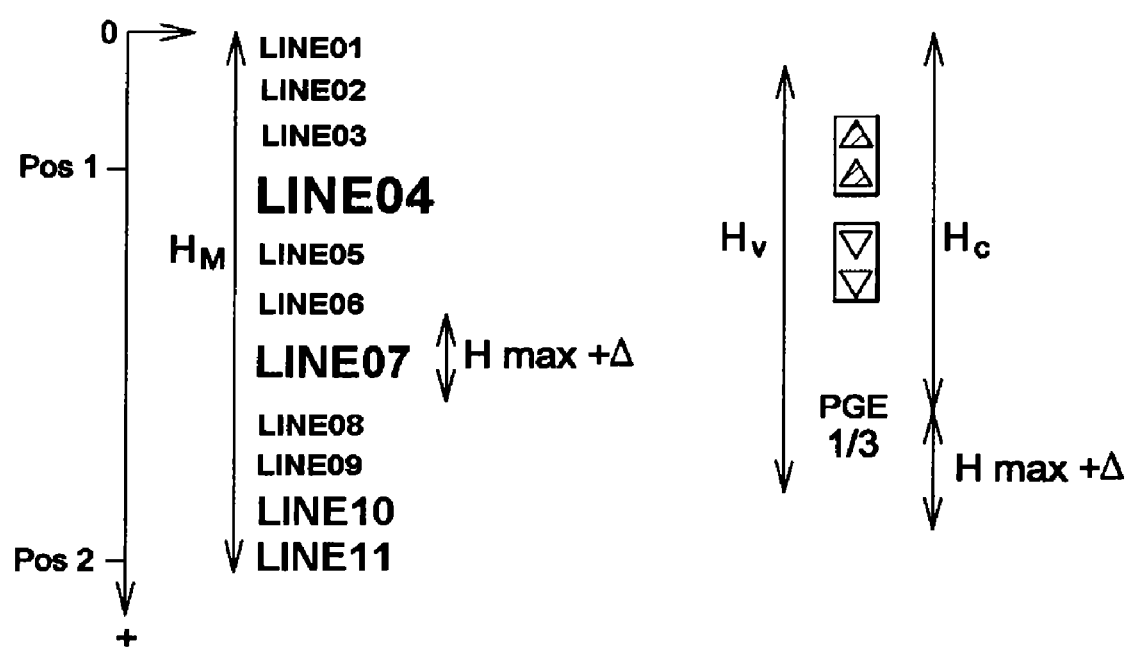
FIG. 5 represents an example of a display with a variable character set.

FIG. 5 shows an example of a display in which lines 1 to 11 employ different character sets. The font size is therefore variable, therefore the number of lines displayable in a window is variable.

In this embodiment, the font height constitutes an additional display parameter. To allow for this new parameter, in this embodiment the formulas for determining the number of pages and the current page are expressed in units, and not as a number of lines. More precisely, the formulas are applied as units of measure or units of image. The unit of measure may be the centimeter. The unit of image may be the pixel.

In the embodiment where the font is fixed, the unit of measure is the line, the line height being fixed.

In the embodiment where the font is variable, the display parameters are the total height of the message—Hm, the visible height of the message on a page—Hv, and the height of message to repeat—Hr. The height of the message to scroll—Hc—may be deduced from the expression:

$$Hc=Hv-Hr.$$

In this embodiment, the term "Hmax" is employed for the maximum font height used, and $\Delta$ for the line-spacing for the employed style. To ensure that no lines are reduced, the height selection employs a multiple of the largest font. The height of the message to scroll may be deduced from the expression:

$$Hc=Lc*(Hmax+\Delta).$$

It is thus possible to determine the number of pages necessary for displaying the total message, by applying the following formula:

$$Np = \text{lower\_full\_part}\left(\frac{Hm - Hv + 2Hc - 1}{Hc}\right)$$

$$= \text{lower\_full\_part}\left(\frac{Hm - Hv + 2*Lc*H\max + 2\Delta - 1}{Lc*(H\max+\Delta)}\right)$$

Since the number of Np pages must always be greater than 1 if Hm is positive, then the employed expression is:

If $0<Hm\leq Hv-Hc+1 => Np=1$

To determine the number of the currently displayed page, the method examines the height of the bottom of the last line displayed, referred to as "PosBasDa" and shown in FIG. 5 as "Pos 2". This "PosBasDa" height is defined from an origin 0, in the upper left part of the display zone. The total message height—Hm—is thus equal to "PosBasDa", as shown in FIG. 5.

The current page number displayed is then determined using the following formula:

$$Nump = \text{lower\_full\_part}\left(\frac{PosBasDa - Hv - +2Hc - 1}{Hc}\right)$$

where Nump is the number of the current page and PosBasDa is the in-message indicator showing the last length displayed in the current page.

Thus, as for the first embodiment, the display zone may indicate the total number of pages and the current page in the form Nump/Np.

The pilot perceives no difference as regards the display obtained with the first or the second embodiment, the font height parameter being determined automatically by the onboard computer.

It will be therefore be understood that the method of the invention may be packaged as a single and unique computing means, determining both the total number of pages and the current page, irrespective of the type of display considered. The said computing means may be, for example, the aircraft onboard computer. It will also be understood that the process can be adapted for all types of displays.

Irrespective of the embodiment the Invention, the values of the parameters employed for determining the number of pages and the current page may be selected by the pilot via a keyboard or selection keys located either near or on the display. These values may also be selected automatically, depending on the received message. In this case, it is the onboard computer that selects the chosen display type, and therefore the display parameters, depending on the type of message.

The invention claimed is:
1. A method for displaying page by page a roll-down message in a display zone of a display of a cockpit of an aircraft, comprising, for each message:
   selecting a total length for the message to be displayed;
   selecting a visible length for the message to be displayed in the display zone;
   selecting a repeated length for the message, the repeated length being a length displayed in a current page and copied again into a next page; and
   determining a total number of pages to be displayed in order for the total length of the message to be displayed with the selected repeated lengths, the total number of pages being deterministic and determined according to:

$$Np = \left\lfloor \frac{Lm - Lv + 2Lc - 1}{Lc} \right\rfloor$$

with Lc=Lv−Lr, where Np is the total number of pages, Lm is the total length of the message, Lv is the visible length of the message in the display zone, Lr is the repeated length of the message and Lc is a non-repeated length of the message.

2. A method according to claim 1, comprising determining the current page displayed according to:

$$Nump = \left\lfloor \frac{Lda - Lv + 2Lc - 1}{Lc} \right\rfloor$$

where Nump is a current page number displayed, and Lda is an indication in the message of a last length displayed in the current page.

3. A method according to claim 2, wherein determining the current page displayed is performed following a command to roll-down the message.

4. A method according to claims 1, wherein the total length of the message, the repeated length of the message and the visible length of the message are expressed in a number of message lines.

5. A method according to claim 1, wherein the total length of the message, the repeated length of the message and the visible length of the message are expressed in units of measure.

6. A method according to claim 5, wherein the unit of measure is centimeters.

7. A method according to claims 1, wherein the total length of the message, the repeated length of the message and the visible length of the message are measured in units of images.

8. A method according to claim 7, wherein the unit of image is pixels.

9. A method according to claims 1, wherein selecting the total length of the message, the repeated length of the message and the visible length of the message for the total length is established according to a type of display.

10. A method according to claim 9, wherein the type of display is automatically defined according to an origin of the message.

11. A device to display, page by page, a roll-down message in a display zone of a viewer of a cockpit of an aircraft, comprising:

means for selecting total length parameters of the message, a visible length of the message to be displayed in the display zone and a repeated length of the message, the repeated length being a length displayed in a current page and copied again into a next page; and means for determining a total number of pages for the message, the total number of pages being deterministic and determined according to parameters of the message and the following formula:

$$Np = \left\lfloor \frac{Lm - Lv + 2Lc - 1}{Lc} \right\rfloor$$

with Lc =Lv−Lr, where Np is the total number of pages, Lm is the total length of the message, Lv is the visible length of the message in the display zone, Lr is the repeated length of the message and Lc is a non-repeated length of the message, the means for determining being linked to the viewer in the cockpit.

12. A device according to claim 11, comprising means for determining a current page displayed on the viewer.

13. A device according to claim 12, wherein the means for determining the total number of pages and the current page displayed are loaded into a flight calculator of the aircraft.

14. A device according claim 11, wherein the display zone comprises a roll-down key to roll down the message.

15. A device according to claim 14, wherein the roll-down key is displayed in pages Nump/Np, where Nump≦Np, Nump is a current page number displayed and Np is the total number of pages.

16. An aircraft comprising a display device according to claim 11.

17. An aircraft comprising a device for implementing the method according to claim 1.

* * * * *